(12) United States Patent
Springer et al.

(10) Patent No.: US 9,284,045 B1
(45) Date of Patent: Mar. 15, 2016

(54) CONNECTED COCKPIT SYSTEM AND METHOD

(71) Applicant: Garmin International, Inc., Olathe, KS (US)

(72) Inventors: Randy A. Springer, Salem, OR (US); Alan D. Blood, Sherwood, OR (US); Emmett Griffith, Salem, OR (US)

(73) Assignee: Garmin International, Inc., Olathe, KS (US)

( * ) Notice: Subject to any disclaimer, the term of this patent is extended or adjusted under 35 U.S.C. 154(b) by 0 days.

(21) Appl. No.: 14/229,418

(22) Filed: Mar. 28, 2014

(51) Int. Cl.
*B64C 19/00* (2006.01)
*G08G 5/00* (2006.01)

(52) U.S. Cl.
CPC ............ *B64C 19/00* (2013.01); *G08G 5/003* (2013.01)

(58) Field of Classification Search
CPC ... C08G 5/0021; C08G 5/003; H04B 7/18506
USPC ............... 701/3, 16; 455/418, 431; 717/125; 713/155, 189; 709/212, 219, 230, 236; 726/12, 21, 3
See application file for complete search history.

(56) References Cited

U.S. PATENT DOCUMENTS

| | | | |
|---|---|---|---|
| 2006/0270454 A1* | 11/2006 | Gotfried et al. | 455/558 |
| 2010/0105329 A1* | 4/2010 | Durand et al. | 455/41.2 |
| 2010/0289306 A1* | 11/2010 | Saul | 297/239 |
| 2011/0021189 A1* | 1/2011 | Tischer et al. | 455/426.2 |
| 2012/0010806 A1* | 1/2012 | Tseng | 701/201 |
| 2013/0211780 A1* | 8/2013 | Meador et al. | 702/158 |
| 2013/0232237 A1* | 9/2013 | Zulch et al. | 709/220 |
| 2013/0274992 A1* | 10/2013 | Cheriere et al. | 701/32.9 |
| 2013/0305391 A1* | 11/2013 | Haukom et al. | 726/29 |
| 2015/0019862 A1* | 1/2015 | Uczekaj et al. | 713/155 |

OTHER PUBLICATIONS

Printout from http://www.dpreview.com/articles/4616822206/battle-of-the-wi-fi-cards-eye-fi-vs-transcend published prior to Mar. 28, 2014.
Printout from http://www.flyingmag.com/avionics-gear/oem-avionics/pilatus-pc-12-ng-receive-aspen-avionics-connected-panel published prior to Mar. 28, 2014.
Printout from http://www.aspenavionics.com/news/aspen_avionics_announces_connected_panel published prior to Mar. 28, 2014.
Printout from http://en.wikipedia.org/wiki/Eye-Fi published prior to Mar. 28, 2014.

* cited by examiner

*Primary Examiner* — Marthe Marc-Coleman
(74) *Attorney, Agent, or Firm* — Samuel M. Korte; Maxwell M. Ali

(57) ABSTRACT

Techniques are described to simplify operation and maintenance of an aircraft by configuring an avionics unit to wirelessly communicate and receive avionics related data in a seamless fashion. In embodiments, an aircraft is equipped with a regulatory-certified avionics device configured to be installed in the aircraft. The system includes a memory card reader and associated memory card. The memory card includes a wireless transceiver to facilitate communication between the avionics unit and a mobile device (e.g., a tablet computer or smart phone employing a suitable application, a portable avionic device, etc.).

28 Claims, 7 Drawing Sheets

CONNECTED COCKPIT SYSTEM AND METHOD

BACKGROUND

Integrated avionics systems increasingly replace mechanical and electro-mechanical instrument gauges and/or controls historically used in aircraft for displaying information and associated controls for controlling operation of the aircraft. For example, a representative integrated avionic device may furnish integrated Global Positioning System (GPS), navigation, and communication functionality. In embodiments, the integrated avionic system may include one or more display devices to display information for broad situational awareness such as communication information, navigation routes, flight plans, information about aids to navigation (including airports), moving maps, charts, weather information, terrain and obstacle information, traffic information, engine and other aircraft systems information, and so forth. The integrated avionics system may further include controls, such as a touch screen display, buttons, knobs, and so forth, to facilitate control of aircraft functions.

SUMMARY

Techniques are described to simplify operation and maintenance of an aircraft by configuring an avionics unit, which may be part of an integrated avionics system, to wirelessly communicate and receive avionics related data in a seamless fashion. In embodiments, an aircraft is equipped with a regulatory-certified avionics device configured to be installed in the aircraft. The system includes a memory card reader and associated memory card. The memory card includes a wireless transceiver to facilitate communication between the avionics unit and a mobile device (e.g., a tablet computer or smart phone employing a suitable application, a portable avionic device, etc.).

This Summary is provided solely to introduce subject matter that is fully described in the Detailed Description and Drawings. Accordingly, the Summary should not be considered to describe essential features nor be used to determine scope of the claims.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Traditional avionics data management techniques require a pilot to manage large amounts of data from a variety of sources. Pilots typically must manually input flight plan data, instrument data and other avionics data into his/her aircraft's avionics systems. For example, before flight, a pilot may manually enter his/her flight plan into the onboard avionics system of his/her aircraft. Pilots may also track and record flight data and maintenance data for safety and/or for compliance with governmental (FAA) regulations. For example, after completing a flight, a pilot makes an entry into a logbook that tracks information about the aircraft (e.g., when, where and how the aircraft was flown, maintenance issues noted, etc.). This tracking can be tedious and inefficient. Additionally, avionics systems often employ databases that require frequent database updates, which may be time consuming to upload to the system.

Accordingly, techniques are described to simplify operation and maintenance of an aircraft and its avionics systems by configuring an avionics unit, which may be part of an integrated avionics system, to wirelessly communicate avionics related data in a seamless fashion with a mobile device (e.g., a tablet computer or smart phone employing a suitable application, a portable avionic device, a laptop computer, a watch, etc.). The mobile device may communicate with a remote database (e.g., web page) using conventional methods (e.g., cellular data connection to the Internet, etc.) to conveniently acquire data for provision to the avionics unit. The mobile device, when in wireless communication range with the avionics unit, communicates the data to the avionics unit. The avionics unit can also communicate data to the mobile device, which in turn can communicate data to a wireless network or remote server. In this manner, the avionics unit can synchronize with the database by way of a mobile device so that the avionics unit and database substantially mirror one another.

The avionics unit may include a memory card reader configured to receive a memory card (e.g., a Secure Digital (SD) card slot configured to receive an SD card, a MultiMediaCard (MMC) slot configured to receive a MMC card, a Universal Serial Bus (USB) slot configured to receive a USB flash drive, and/or any other standard or customized memory card reader and associated memory card format). The memory card includes a transceiver operable to facilitate communication of information between the avionics unit and the mobile device via a wireless aircraft network (e.g., Wi-Fi, BLUETOOTH, etc.) Providing wireless functionality to the avionics unit via the memory card enables certified avionics units to be wireless enabled without requiring recertification of the avionics units or the cumbersome installation of additional avionic hardware that may require certification.

Example Environment

Figure 1:
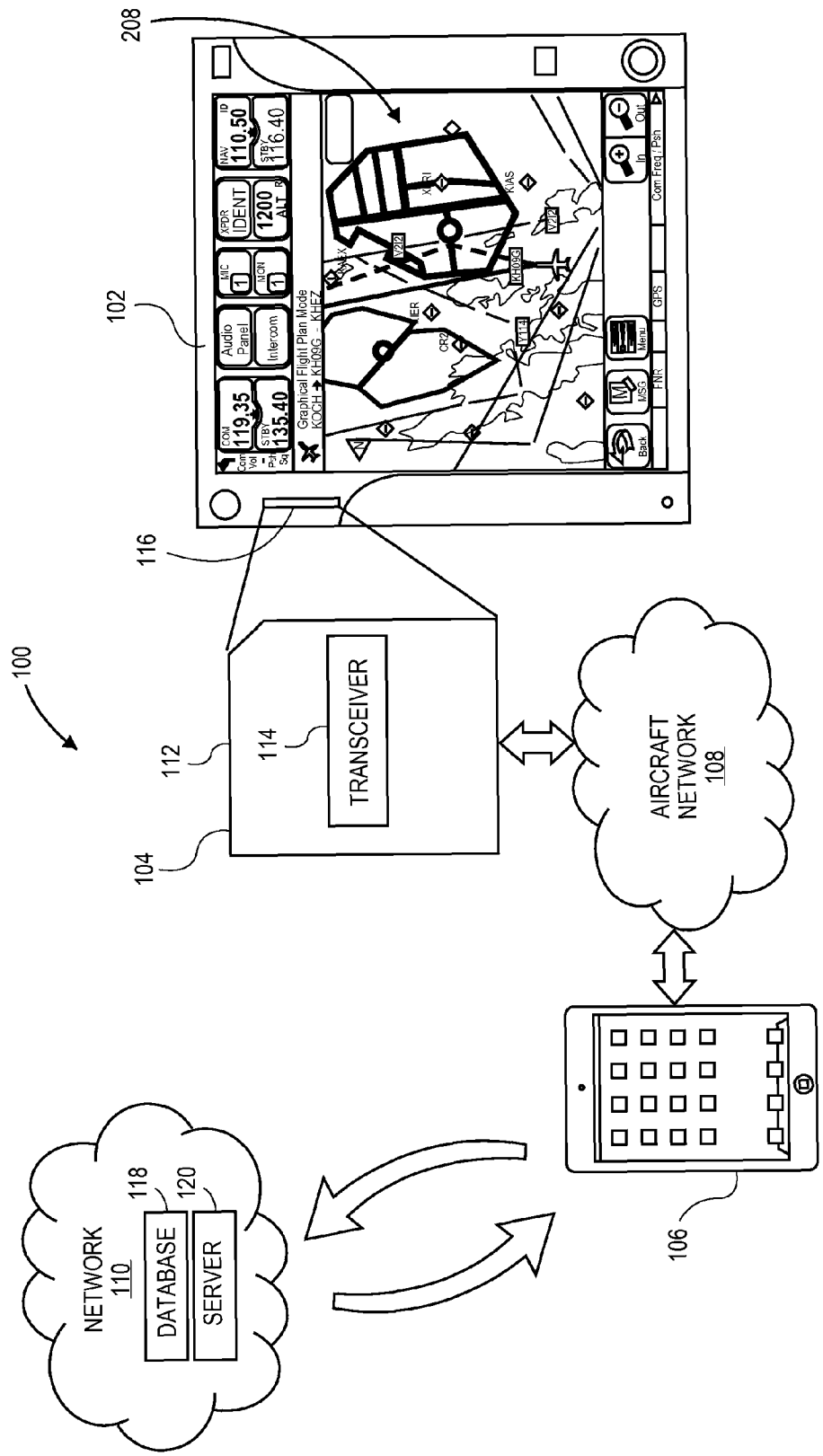
FIG. 1 is an illustration of an example environment in which a wireless device such as a memory card equipped with a transceiver is operable to facilitate communication of information between an avionics unit, which may be part of an integrated avionics system, and a mobile device via a wireless network.

FIG. 1 illustrates an example environment 100 in which an avionics unit 102 employs a wireless device 104 (e.g., memory card) that is operable to facilitate communication of information (e.g., avionics data) between the avionics unit 102 and a mobile device 106 via a wireless aircraft network 108. In embodiments, the mobile device 106 may acquire avionics data via a network 110 (e.g., the Internet) for provision to the avionics unit 102 while the mobile device 106 is remotely located (e.g., is not located in the cockpit of the aircraft) or while the mobile device 106 is used within the aircraft cockpit. Similarly, the mobile device 106 may receive avionics data (e.g., maintenance data, logbook entries, etc.) from the avionics unit 102 to facilitate operation of the aircraft. The mobile device 106 may communicate this avionics data via the network 110. The mobile device 106 may thus be employed to transfer (e.g., send and/or receive) avionics data to and/or from the avionics unit 102. In this manner, avionics data may be communicated between the avionics unit 102, the mobile device 106 and/or the network 110.

In embodiments, the avionics unit 102 includes functionality to communicate avionics data to a user such as a pilot, co-pilot, or navigator and/or facilitate command and control of the aircraft. This functionality can include furnishing flight instrument data, warning information, controlling communications (e.g., voice communication over radio), and so forth. In one specific embodiment, the avionics unit 102 comprises a Garmin® GTN series avionics unit such as a Garmin® GTN 750 avionics unit or a Garmin® GTN 650 avionics unit. Other avionics units are also contemplated.

The wireless device 104 (e.g. memory card) includes functionality to furnish wireless communication between the avionics unit 102 and the mobile device 106 via the wireless aircraft network 108. In embodiments, a wireless device 104 may comprise a memory card 112 such as, for example, a secure digital (SD) memory card, a micro SD card, a MultiMediaCard (MMC), a Universal Serial Bus (USB) flash drive, a flash memory card, or the like, that includes a transceiver 114 configured to communicate with the mobile device 106 via the wireless aircraft network 108. The wireless aircraft network 108 may comprise one or more personal area networks (PAN). The personal area network may comprise any wireless network suitable for providing data communication between two devices, including but not limited to a Wi-Fi (IEEE 802.11) network, a BLUETOOTH network (Bluetooth SIG, Inc., Kirkland, Wash.) implementing one or more BLUETOOTH protocols or profiles including BLUETOOTH Serial Port Profile (SPP) or BLUETOOTH Low-Energy, an ANT+ network, other short and long range wireless networks, combinations thereof, and so forth.

In embodiments where the wireless device 104 comprises a memory card 112, the avionics unit 102 includes a memory card reader 116 that is configured to receive the memory card 112 to facilitate communication between the memory card 112 and the avionics unit 102. For example, the avionics unit 102 may include a Secure Digital (SD) card slot configured to receive an SD card, a MMC slot configured to receive a MMC card, a flash memory card slot configured to receive a flash memory card, and the like. Moreover, in some embodiments, as discussed below in the description of FIGS. 3A and 3B, the avionics unit 102 may be a component of an integrated avionic system that includes multiple panel mount devices, where one or more of the panel mount devices can be in communication with some or all of the other panel mount devices via an aircraft avionics communication system (e.g., an aircraft bus or network). In such embodiments, it is contemplated that one or more memory card reader(s) 116 can be disposed in any of the panel mount devices (with or without a display). Utilization of a memory card slot to couple the memory card 112, including transceiver 114, with the avionics unit 102 allows wireless communication functionality to be imparted to the avionics unit 102 without requiring the addition or modification of equipment that would necessitate a change to the regulatory certification of the avionics unit 102. The memory card reader 116 may be associated with a primary flight display, a multi-function flight display, a control and display unit, a line replaceable unit, or any other avionics unit 102 configured for use or installation in an aircraft.

The network 110 may provide access to a database (which may be a remote database) 118 in which avionics data can be stored. In some embodiments, avionics data can include, but is not necessarily limited to, flight planning data, weather data (such as weather data for a flight), position/velocity & attitude data, logbook data, maintenance data (such as for an aircraft), communication data (e.g., texting, telephone, etc.), data associated with an avionics unit (e.g., onboard avionics), terrain data, obstacle data, airfield data, airport data, avionics software updates, and so forth. For example, in embodiments where the network 110 is the internet, the database 118 may function as an internet-accessible database.

The database 118, in some embodiments, may be a commercial and/or government database available on via an external network (e.g., the Internet) such as through a web page or web portal served up by the server 120. The database 118 can provide avionics data and other aircraft and flight-related data. The database 118 can be maintained by a fee-for-service provider or subscription-based service provider. Although one database is illustrated in FIG. 1, the database 118 may be representative of one or more databases (e.g., a navigation database, a terrain database, a charts database, an obstacle database, etc.). Respective ones of these databases can be separately accessible. Additionally, respective databases 118 may be available as a paid service or available as a free service. In one specific embodiment, one or more databases 118 may be furnished via a website containing one or more webpages that is accessed by the mobile device 106, via the network 110. A representative website is available at http://www.FlyGarmin.com. Other services are also contemplated.

Figure 2:
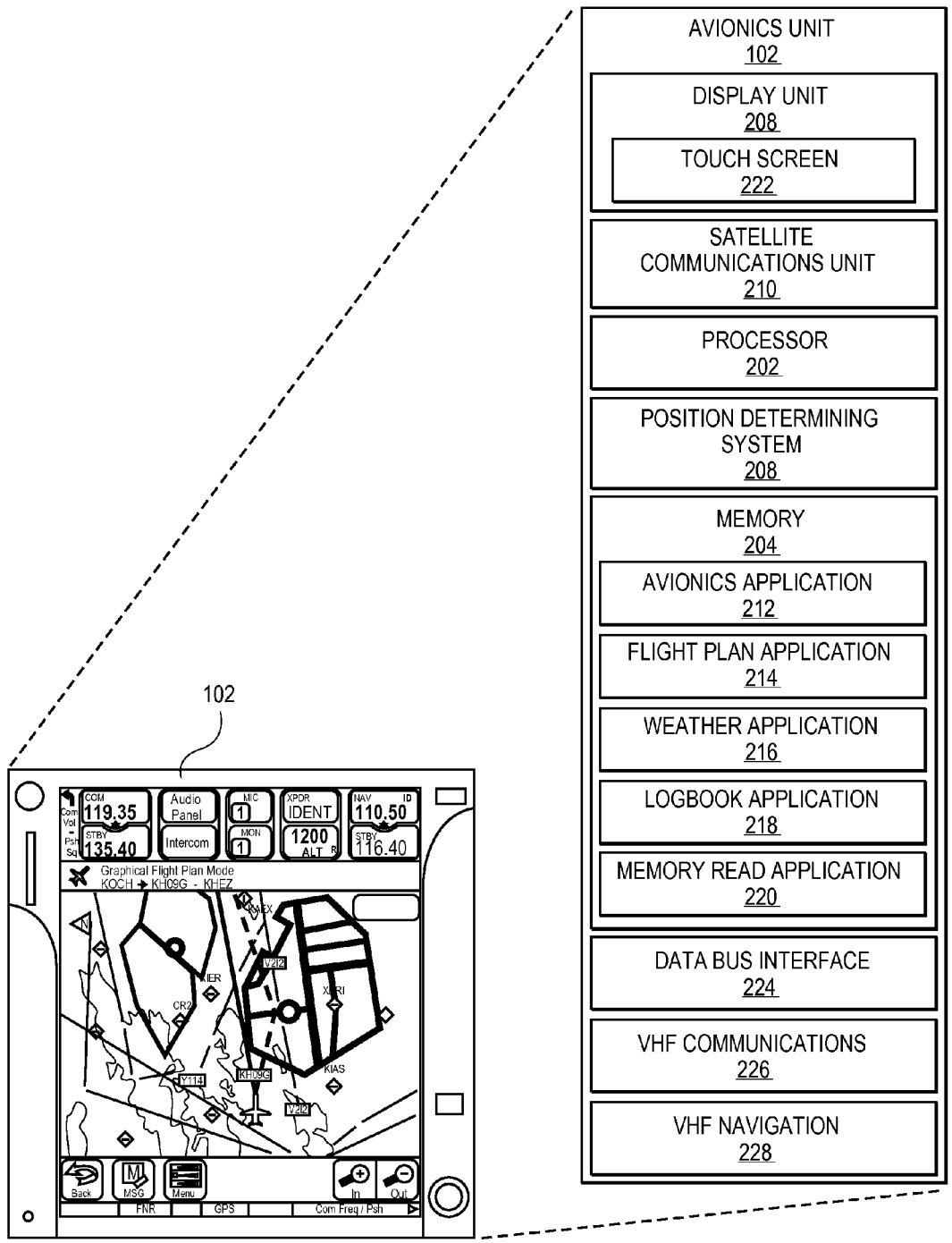
FIG. 2 is block diagram illustrating an avionics unit that may be employed in the environment of FIG. 1 in accordance with embodiments of the present disclosure.

An example avionics unit 102 suitable for use in the environment 100 of FIG. 1 is illustrated in FIG. 2. As shown, the avionics unit 102 includes a processor 202 and a memory 204 in communication with the processor 202, and a display unit 206. In embodiments, the avionics unit may further include a position determining system 208 that may include a global navigation satellite system (GNSS) receiver, such as a global positioning system (GPS) receiver, or the like, and a satellite communication unit 210, and so forth. While these features will be described with particularity, it is to be appreciated that the avionics unit 102 can include other flight related components for providing aircraft information, controlling the aircraft, retrieving data from memory 204, and so on.

The processor 202 provides processing functionality for the avionics unit 102 and may include any number of processors, micro-controllers, or other processing systems and resident or external memory for storing data and other information accessed or generated by the avionics unit 102. The processor 202 may execute one or more software programs which implement techniques described herein. The processor 202 is not limited by the materials from which it is formed or the processing mechanisms employed therein and, as such, may be implemented via semiconductor(s) and/or transistors (e.g., electronic integrated circuits (ICs)), and so forth.

The memory 204 is an example of tangible computer-readable media that provides storage functionality to store various data associated with the operation of the avionics unit 102, such as the software programs and code segments mentioned above, or other data to instruct the processor 202 and other elements of the avionics unit 102 to perform the functionality described herein. Although a single memory 204 is shown, a wide variety of types and combinations of memory may be employed. The memory 204 may be integral with the processor 202, stand-alone memory, or a combination of both. The memory 204 may include, for example, removable and non-removable memory elements, such as random-access memory (RAM), read-only memory (ROM), flash memory (e.g., a multi-media card (MMC), a secure digital (SD) card, a mini-SD card, and/or a micro-SD card), magnetic memory, optical memory, universal serial bus (USB) memory, a custom memory card, and so forth.)

The memory 204 is capable of storing application modules, such as an avionics application 212, a flight plan application 214, a weather application 216, a logbook application 218, or the like, that may be executed by the processor 202 to provide functionality in accordance with the techniques described herein. In embodiments, the memory 204 may further be capable of storing other application modules that may or may not be avionics related. The avionics application 212, flight plan application 214, weather application 216, logbook application 218, or other applications are representative of one or more applications that allow the avionics unit 102 to process (e.g., display and or manipulate) avionics related data, weather-related data, flight plan-related data, logbook related data, or other data that pertain to the aircraft. This data may substantially mirror data stored on the mobile device 106. In this manner, a user such as a pilot, copilot, navigator, or the like can interact with the applications using the mobile device 106 or the avionics unit 102 and have a substantially equivalent user experience.

Figure 4:
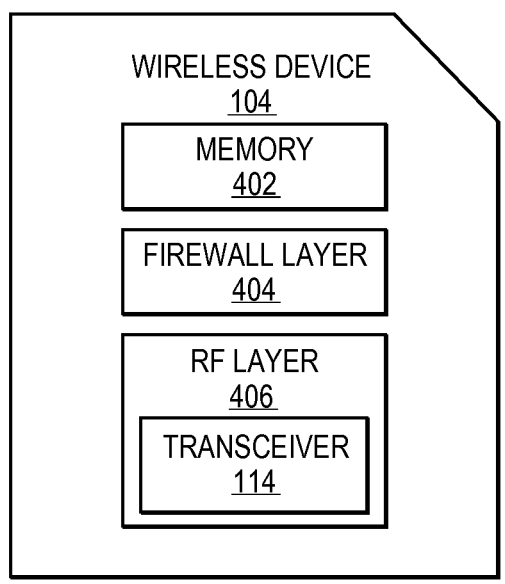
FIG. 4 is a block diagram illustrating an example wireless device that may be employed in the environment of FIG. 1 in accordance with embodiments of the present disclosure.

The avionics unit 102 may employ an application module (the memory read application 220) that may be stored in memory 204 and executed by the processor 202 to read avionic information from the memory 402 of wireless device 104 (see FIG. 4). The memory read application 220 allows the avionics unit 102 to access wirelessly-acquired data without requiring that the avionics unit 102 be equipped with additional hardware and/or software for wireless communication capability. The memory read application 220 may further include functionality to write avionic information to the memory 402 of the wireless device 104 for transmission to the mobile device 106 via the wireless aircraft network 108 using the transceiver 114 of the wireless device 104.

The display unit 206 displays information to the pilot of the aircraft. In implementations, the display unit 206 may comprise an LCD (Liquid Crystal Diode) display, a TFT (Thin Film Transistor) LCD display, an LEP (Light Emitting Polymer or PLED (Polymer Light Emitting Diode) display, a cathode ray tube (CRT), and so forth, capable of displaying text and graphical information. The display unit 206 may be backlit via a backlight such that it may be viewed in the dark or other low-light environments.

The display unit 206 may include a touch interface, such as a touch screen 222, which can detect a touch input within a specified area of the display unit 206 for entry of information and commands. In implementations, the touch screen 222 may employ a variety of technologies for detecting touch inputs. For example, the touch screen 222 may employ infrared optical imaging technologies, resistive technologies, capacitive technologies, surface acoustic wave technologies, and so forth. In some implementations, the avionics unit 102 may further include a keyboard for entry of data and commands in addition to the touch screen 222. In further implementations, buttons, knobs and so forth, may be used for entry of data and commands in addition to the touch screen 222.

The position-determining system 208 is configured to provide position-determining functionality for the avionics unit 102. Position-determining functionality, for purposes of the following discussion, may relate to a variety of different navigation techniques and other techniques that may be supported by "knowing" one or more positions of the aircraft. For example, position-determining functionality may be employed to provide location data, velocity data, acceleration data, rate of climb/descent data, heading data, and a variety of other navigation-related data to the processor 202.

In embodiments, the position determining system 208 may comprise a receiver that is configured to receive signals from one or more position-transmitting sources. For example, the position determining system 208 may be configured for use with a Global Navigation Satellite System (GNSS). In embodiments, the position determining system 208 may be a Global Positioning System (GPS) receiver operable to receive navigational signals from GPS satellites and to calculate a location of the aircraft as a function of the signals. Other exemplary position-determining systems include, but are not limited to, a Global Orbiting Navigation Satellite System (GLONASS), a Galileo navigation system, and/or other satellite or terrestrial navigation systems.

As illustrated in FIG. 2, the position-determining system 208 may be integral with the avionics unit 102. In other embodiments, the position determining system 208 may be configured as one or more separate components that communicate position information with the avionics unit 102 via a wired or wireless interface such as the avionics data bus interface 222 described below. A variety of configurations are possible.

The satellite communication unit 210 is representative of functionality to sending/receiving data via a satellite communications link. Although one satellite communication unit 210 is shown, in embodiments, the avionics unit 102 may be configured to implement multiple communication units that operate according to different standards, e.g., Sirius XM, Iridium, and so forth.

In some embodiments, the avionics unit 102 may comprise a single panel mount device (e.g., a single panel mounted (or rack mounted) avionics unit as shown in FIGS. 1 and 2). However, in other embodiments, the avionics unit 102 may comprise one or more component devices of an integrated avionics system 300 that may include multiple panel/rack mount devices (e.g., two or more panel mounted (or rack mounted) avionics units). In such systems, one or more of the panel mount devices may include a display such as flight display, and/or one or more of the panel mount devices may comprise an instrumentation/control device without a display.

In various embodiments, the avionics unit 102 is a regulatory-certified avionics system subject to Federal Aviation Administration (FAA) regulatory oversight (and/or European Aviation Safety Agency (EASA) oversight) via a technical standard order (TSO) or other requirement, due to its inclusion in an aircraft subject to a type certificate (TC) or supplemental type certificate (STC). In configurations, the avionics unit 102 is installed in an aircraft pursuant to its certification. Therefore, in certain embodiments, the avionics unit 102 is not a commercial, uncertified, electronics device that is simply placed or mounted within an aircraft.

Figure 3A:
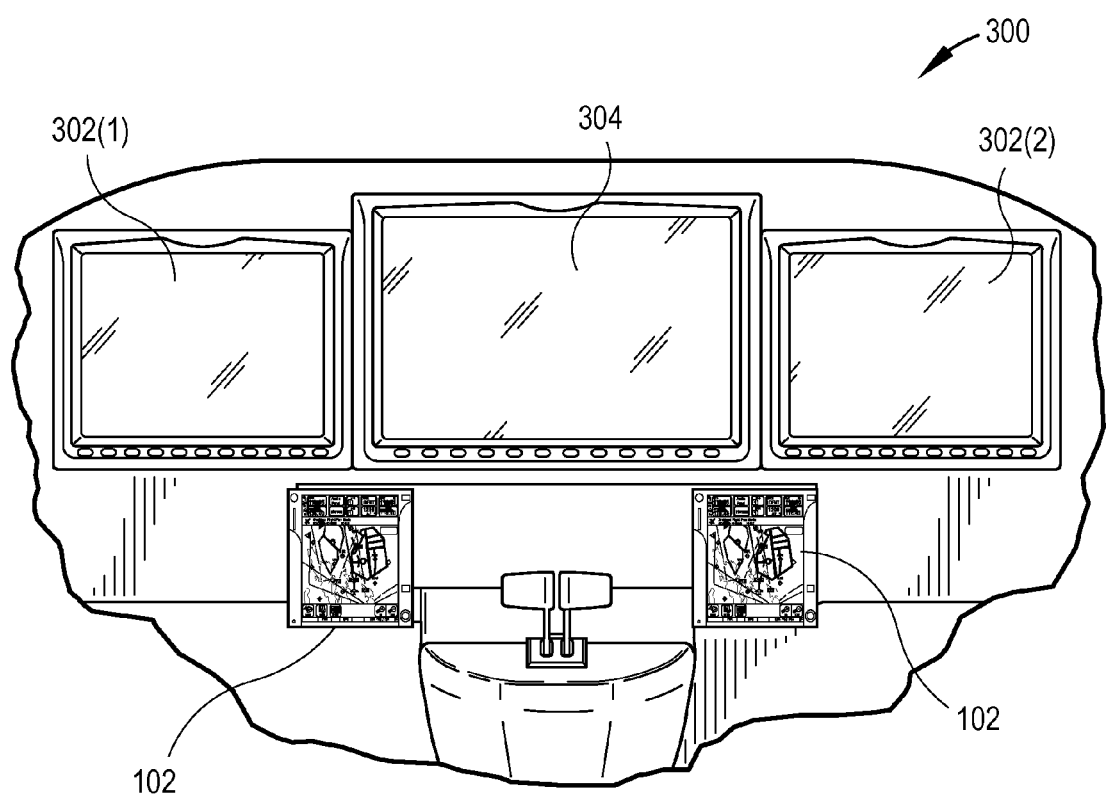
FIG. 3A is an illustration of a representative integrated avionics system configured in accordance with embodiments of the present disclosure, wherein the integrated avionics system may employ the avionics unit of the environment shown in FIG. 1.
Figure 3B:
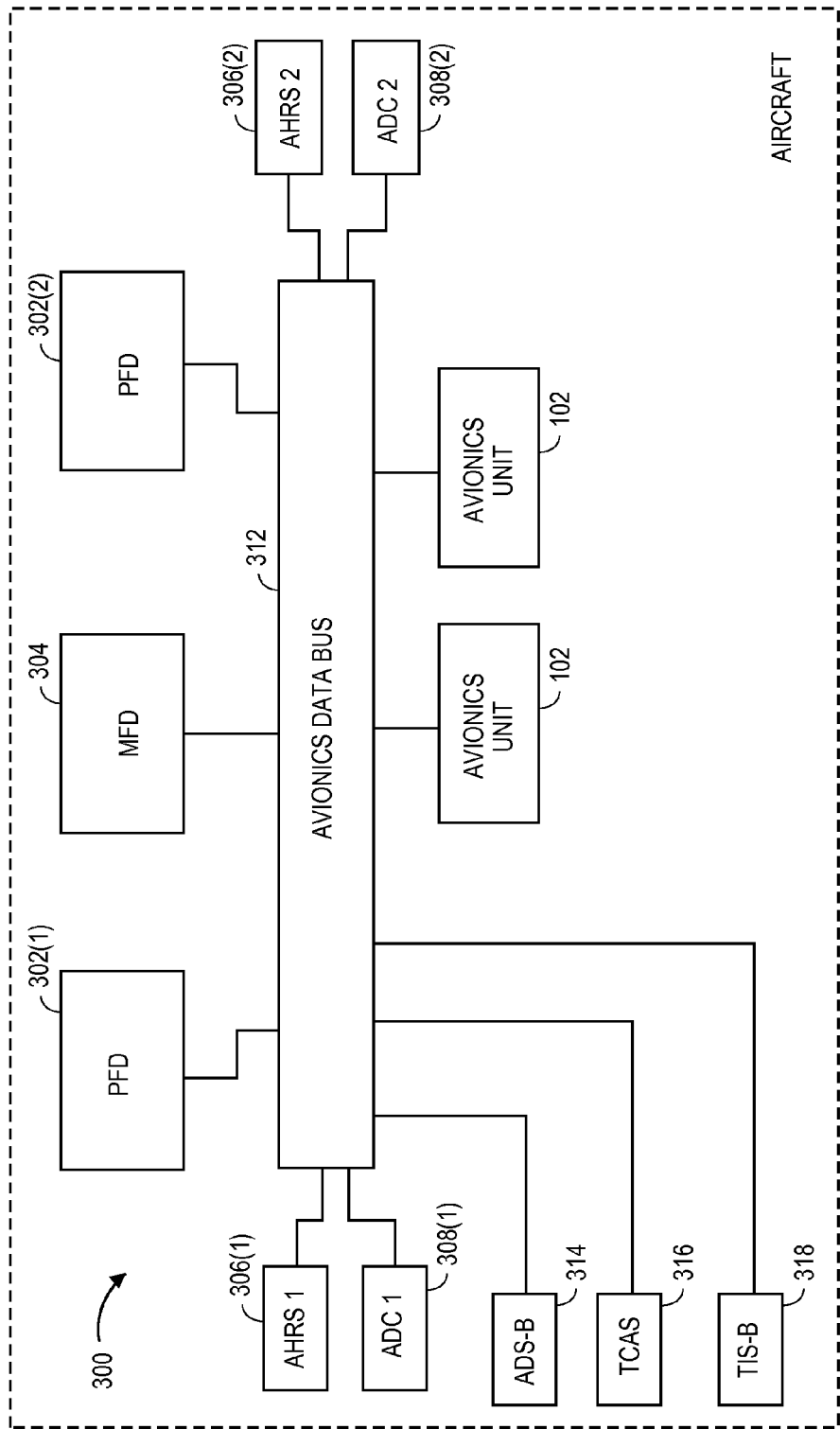
FIG. 3B is a block diagram illustrating an embodiment of the avionics system shown in FIG. 3A.

An example integrated avionics system 300 is illustrated in FIGS. 3A and 3B. The integrated avionics system 300 may include one or more primary flight displays (PFDs) 302, and one or more multifunction displays (MFD) 304. For instance, in the implementation illustrated, the integrated avionics system 300 may be configured for use in an aircraft that is flown by a flight crew having two pilots (e.g., a pilot and a co-pilot). In this implementation, the integrated avionics system 300 may include a first PFD 302(1), a second PFD 302(2), and an MFD 304 that are mounted in the aircraft's instrument panel. The MFD 304 is mounted generally in the center of the instrument panel so that it may be accessed by either pilot (e.g., by either the pilot or the copilot). The first PFD 302(1) is mounted in the instrument panel generally to the left of the MFD 304 for viewing and access by the pilot. Similarly, the second PFD 302(2) is mounted in the instrument panel generally to the right of the MFD 304 for viewing and access by the aircraft's copilot or other crew member or passenger.

The PFDs 302 may be configured to display primary flight information, such as aircraft attitude, altitude, heading, vertical speed, and so forth. In implementations, the PFDs 302 may display primary flight information via a graphical representation of basic flight instruments such as an attitude indicator, an airspeed indicator, an altimeter, a heading indicator, a course deviation indicator, and so forth. The PFDs 302 may also display other information providing situational awareness to the pilot such as terrain information and ground proximity warning information.

As shown in FIG. 3B, primary flight information may be generated by one or more flight sensor data sources including, for example, one or more attitude, heading, angular rate, and/or acceleration information sources such as attitude and heading reference systems (AHRS) 306, one or more air data information sources such as air data computers (ADC) 308, and/or one or more angle of attack information sources. For instance, in one implementation, the AHRSs 306 may be configured to provide information such as attitude, rate of turn, slip and skid; while the ADCs 308 may be configured to provide information including airspeed, altitude, vertical speed, and outside air temperature. Other configurations are possible.

As noted, the integrated avionics system may include one or more avionics units 102. In embodiments, the avionics unit 102 (e.g., a single integrated avionics unit (IAU) is illustrated) may aggregate the primary flight information from the AHRSs 306 and ADCs 308 and provide the information to the PFDs 302 via an avionics data bus 312. The avionics unit 102 may also function as a combined communications and navigation radio. For example, the avionics unit 102 may further include an avionics data bus interface 224, a two-way Very High Frequency (VHF) communications transceiver 226, a VHF navigation receiver 228 with glide slope, and so forth.

The avionics data bus interface 224 furnishes functionality to enable the avionics unit 102 to communicate with one or more avionics data buses such as the avionics data bus 312 shown in FIG. 3. In various implementations, the avionics data bus interface 224 may include a variety of components, such as processors, memory, encoders, decoders, and so forth, and any associated software employed by these components (e.g., drivers, configuration software, etc.). In implementations, the avionics data bus 312 may comprise a high speed data bus (HSDB), such as data bus complying with ARINC 429 data bus standard promulgated by the Airlines Electronic Engineering Committee (AEEC), a MIL-STD-1553 compliant data bus, and so forth.

The MFD 304 displays information describing operation of the aircraft such as navigation routes, moving maps, engine gauges, weather radar, ground proximity warning system (GPWS) warnings, traffic collision avoidance system (TCAS) warnings, airport information, and so forth, that are received from a variety of aircraft systems via the avionics data bus 312.

The first PFD 302(1), the second PFD 302(2), and/or the MFD 304 may receive additional data aggregated by one or more of the avionics units 102 from a one or more of a plurality of systems communicatively coupled with the avionics units 102. For example, the avionics unit 102 may be communicatively coupled with and may aggregate data received from one or more of: an Automatic Dependent Surveillance-Broadcast (ADS-B) system 314, Traffic Collision Avoidance System (TCAS) 316, and a Traffic Information Services-Broadcast (TIS-B) system 318.

One or more of the displays PFD 302(1), PFD 302(2), MFD 304 of the avionics system 300 may be one of: an LCD (Liquid Crystal Diode) display, a TFT (Thin Film Transistor) LCD display, an LEP (Light Emitting Polymer or PLED (Polymer Light Emitting Diode) display, a cathode ray tube (CRT) and so forth, capable of displaying text and graphical information. Further, one or more of the displays PFD 302(1), PFD 302(2), MFD 304 may be backlit via a backlight such that it may be viewed in the dark or other low-light environments.

In embodiments, the avionics units 102 may provide a user interface (e.g., a touch interface) for the pilot for controlling the functions of one or more of the displays PFD 302(1), PFD 302(2), MFD 304 and for entering navigational data into the system 300. However, in other embodiments, the integrated avionics system 300 may further include one or more separate controllers which communicate avionics units 102 via the avionics data bus 312 to furnish this interface. The avionics unit 102 may be configured for aggregating data and/or operating in an operating mode selected from a plurality of user-selectable operating modes based upon inputs provided by the flight crew. In embodiments, the avionics units 102 may be positioned within the instrument panel so that they may be readily viewed and/or accessed by the pilot flying the aircraft. The avionics unit 102 furnishes a general purpose pilot interface to control the aircraft's avionics. For example, the avionics unit 102 allows the pilot to control various systems of the aircraft, such as the autopilot system, navigation systems, communication systems, engines, and so forth, via the avionics data bus 312. In implementations, the avionics unit 102 may also be used for control of the integrated avionics system 300 including operation of the PFD 302 and MFD 304. In implementations, as shown in FIG. 3A, the avionics unit 102 includes a display unit 206. The display unit 206 of the avionics unit 102 may be used for the display of information suitable for use by the pilot of the aircraft to control a variety of aircraft systems.

FIG. 4 illustrates an example wireless device 104 that may be employed in the environment 100 of FIG. 1 in accordance with embodiments of the present disclosure. As noted, the wireless device 104 includes functionality to furnish wireless communication between the avionics unit 102 and the mobile device 106 via the wireless aircraft network 108 (see FIG. 1). In embodiments, a wireless device 104 may comprise a memory card 112 such as, for example, a secure digital (SD) memory card, a mini-SD memory card, a micro SD card, a MMC card, a flash memory card, or the like, that includes a transceiver 114 (e.g., a transmitter/receiver). The memory card 112 can be received in the memory card reader 116 of the avionics unit 102 and configured to communicate with the mobile device 106 via the wireless aircraft network 108. Example wireless aircraft networks 108 may include one or more personal area networks. The personal area network may comprise any wireless network suitable for providing data communication between two devices, including but not limited to a Wi-Fi (IEEE 802.11) network, a BLUETOOTH network (Bluetooth SIG, Inc., Kirkland, Wash.) implementing one or more BLUETOOTH protocols or profiles including BLUETOOTH Serial Port Profile (SPP) or BLUETOOTH Low-Energy, an ANT+ network, other short and long range wireless networks, combinations thereof, and so forth.

In such embodiments, the memory card 112 can include a memory 402, a firewall layer 404, and a radio frequency (RF) layer 406. The memory 402 is an example of tangible computer-readable media that provides storage functionality to store data and other information including data received via the RF layer (e.g., by transceiver 114) such as avionics data and the like. Although a single memory 402 is shown, a wide variety of types and combinations of memory may be employed. In embodiments, the memory 204 comprises flash memory. However, other types of memory are contemplated. The firewall layer 404 may implement a security system that controls incoming and outgoing network traffic by analyzing transmitted data packets and determining whether the data packets should be passed (e.g., to the avionics unit 102), based on a rule set. The RF layer 406 includes the transceiver and associated hardware and software to provide communication via the wireless aircraft network 108, via Bluetooth, Wi-Fi, IEEE 802.11, or other radio frequencies. In some configurations, the RF layer 406 is compatible with the Wireless LAN SD memory card standard and/or other methods of equipping memory cards with wireless functionality. In other configurations, RF layer 406 employs wireless functionality not subject to SD card standards.

Figure 5:
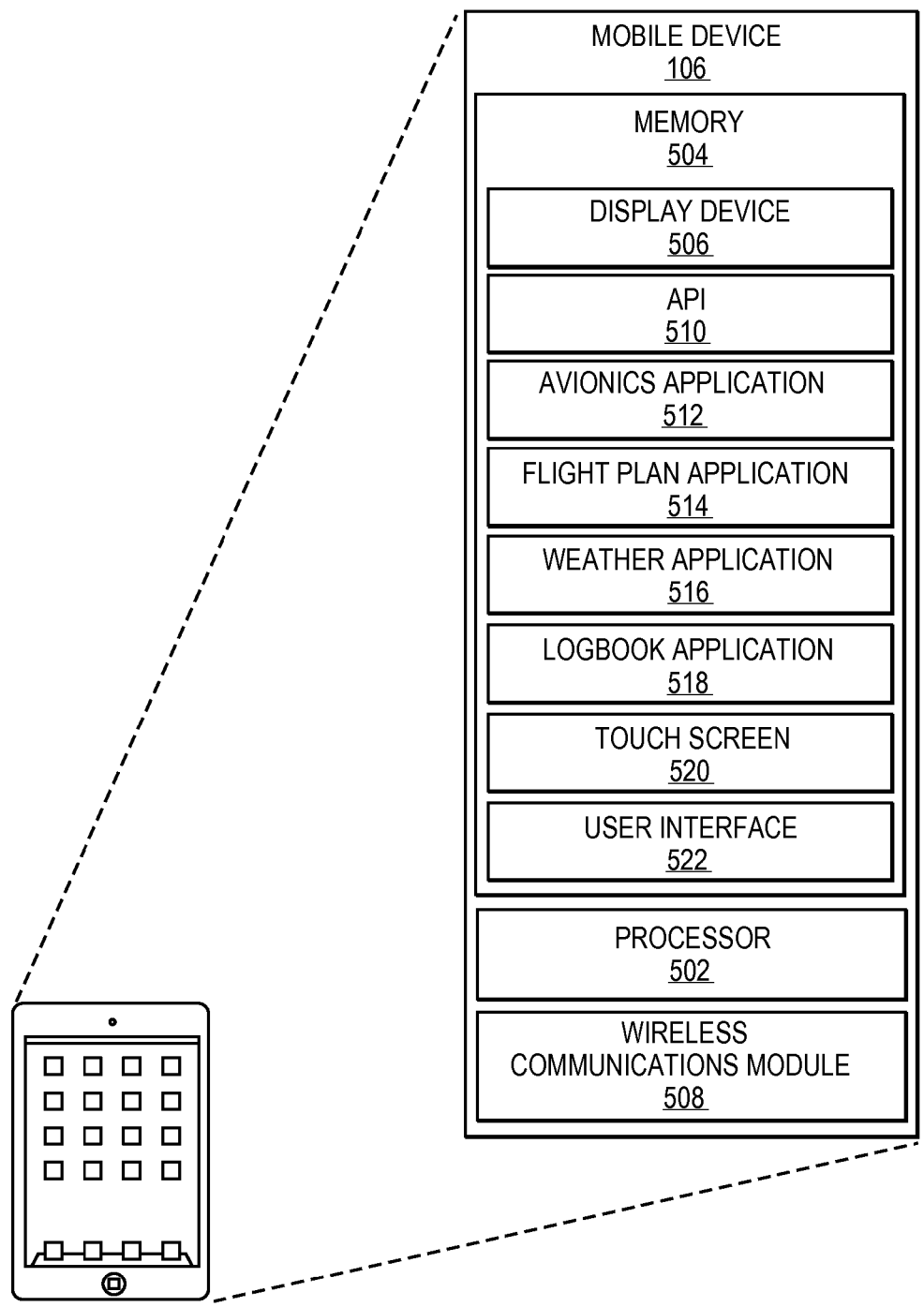
FIG. 5 is a block diagram illustrating an example mobile device that may be employed in the environment of FIG. 1 in accordance with embodiments of the present disclosure, wherein the mobile device is operable to communicate information with the avionics unit over a wireless aircraft network via a wireless device such as the wireless device of FIG. 4.

FIG. 5 illustrates an example mobile device 106 that may be employed in the environment 100 of FIG. 1 in accordance with embodiments of the present disclosure. In some embodiments, mobile device 106 has specialized functionality. However the mobile device 106 may be a dedicated device, such as a mobile avionics device for use with an avionics unit 102 of the present disclosure. The mobile device 106 may thus comprise any of a variety of types of portable (e.g., handheld) electronic devices. For example, in various embodiments, the mobile device 106 may comprise a portable electronic device such as a tablet computer (e.g., iPad), a smart phone (e.g., iPhone, Android device), a portable navigation device, a laptop computer, a portable aviation device, a watch or wearable electronic device such as a smart watch or flight watch, combinations thereof, and the like. The mobile device 106 may employ one or more applications implementing the techniques of the present disclosure, a dedicated portable avionic device, a laptop computer that employs software implementing techniques of the present disclosure, and so forth. The mobile device 106 may communicate with a remote database (e.g., web page) 118 using conventional methods (e.g., wired connection to the Internet, wireless (e.g., Wi-Fi or cellular data) connection to the Internet, etc.) to acquire data for provision to the avionics unit 102. The mobile device 106, when in wireless communication range with wireless device 104 (memory card 112) received by the avionics unit 102, communicates the data to the avionics unit 102. The avionics unit 102 can also communicate data to the mobile device 106, which in turn can communicate data to a network 110 or remote server 120. In this manner, the avionics unit 102 can be synchronized with the database 118 by way of the mobile device 106 and wireless device 104 so that the avionics unit 102 and database substantially mirror one another.

As shown, the mobile device 106 includes a processor 502, a memory 504 in communication with the processor 502, a display device 506, and a wireless communication module 508. The processor 502 is representative of one or more processors that are operable to execute a program of instructions to perform a function (e.g., support an application on the mobile device 106, and so forth). The processor 502 provides processing functionality for the mobile device 106 and may include any number of processors, micro-controllers, or other processing systems and resident or external memory for storing data and other information accessed or generated by the mobile device 106. The processor 502 may execute one or more software programs or applications that implement techniques described herein. The processor 502 is not limited by the materials from which it is formed or the processing mechanisms employed therein and, as such, may be implemented via semiconductor(s) and/or transistors (e.g., electronic integrated circuits (ICs)), and so forth.

The memory 504 is an example of tangible computer-readable media that provides storage functionality to store various data associated with the operation of the mobile device 106, such as the software programs, applications, and code segments mentioned above, or other data to instruct the processing system 502 and other elements of the mobile device 106 to perform the functionality described herein. Although a single memory 504 is shown, a wide variety of types and combinations of memory may be employed. The memory 504 may be integral with the processing system 502, stand-alone memory, or a combination of both. The memory 504 may include, for example, removable and non-removable memory elements, such as random-access memory (RAM), read-only memory (ROM), flash memory, magnetic memory, optical memory, universal serial bus (USB) memory, and so forth.

The memory 504 (including memory supporting the database) is representative of data storage functionality for storing application and program information including avionics related application data (e.g., application updates, and other avionics data). As shown, the memory 504 is capable of storing application modules, such as an avionics application 512, a flight plan application 514, a weather application 516, a logbook application 518, or the like, which may be similar in functionality and/or appearance to the applications on avionics unit 102. In embodiments, the memory 204 may further be capable of storing other application modules that may or may not be avionics related. These applications may be executed by the processor 502 to provide functionality in accordance with the techniques described herein. The avionics application 212, flight plan application 214, weather application 216, logbook application 218, or other applications are representative of one or more applications that allow the mobile device 106 to process (e.g., display and or manipulate) avionics related data, weather-related data, flight plan-related data, logbook related data, or other data that pertain to the aircraft. This data may substantially mirror data stored on the avionics unit 102. In this manner, a user such as a pilot, copilot, navigator, or the like can interact with the applications using the mobile device 106 or the avionics unit 102 and have a substantially equivalent user experience.

The mobile device 106 may also include an API (application program interface) 510, which may be open or secured. In one embodiment, API 510 can be a secure API that supports one or more applications included on the processor in a secure manner. In this embodiment, the secure API may support a suite of avionics related applications (e.g., avionics application 512, flight plan application 514, weather application 516, logbook application 518, etc.) that uses a common data or communication format. In this manner, the avionics data and avionics applications can be protected and the data can be associated with a trusted source. In some embodiments, a secure API is designed to work in conjunction with the server 120 and/or database 118.

The display device 506 displays information to the user of the mobile device 106 (e.g., the pilot of the aircraft). In implementations, the display device 506 may comprise an LCD (Liquid Crystal Diode) display, a TFT (Thin Film Transistor) LCD display, an LEP (Light Emitting Polymer or PLED (Polymer Light Emitting Diode) display, a cathode ray tube (CRT), and so forth, capable of displaying text and graphical information. The display device 506 may be backlit via a backlight such that it may be viewed in the dark or other low-light environments.

The display device 506 may include a touch interface, such as a touch screen 520, which can detect a touch input within a specified area of the display device 506 for entry of information and commands. In implementations, the touch screen 520 may employ a variety of technologies for detecting touch inputs. For example, the touch screen 520 may employ infrared optical imaging technologies, resistive technologies, capacitive technologies, surface acoustic wave technologies, and so forth. In some implementations, the mobile device 106 may further include a keyboard for entry of data and commands in addition to the touch screen 520. In further implementations, buttons, knobs and so forth, may be used for entry of data and commands in addition to the touch screen 520.

The mobile device 106 may include a user interface (e.g., a graphical user interface) 524, which may be stored in the memory 504 and executed by the processor 502. Other input devices can also be included or included in place of the touch screen. For example, a navigation button can be included to permit a user to navigate among data, ions and the like output via the display. In some embodiments, the mobile device 106, including the touch-screen, is configured to provide a virtual keyboard or like functionality to accept user input. Thus, a user can manually input avionics and other data to the mobile device 106. For example, a pilot may input a flight plan manually into the mobile device 106. The mobile device 106 can then upload the flight plan information to the server 120 and/or database 118 automatically, by manually initiating upload, and/or upon the occurrence of an event. In other embodiments, a physical keyboard or a keyboard-like device may be included for accepting user input.

The wireless communication module 508 can include a wireless transceiver (e.g., a BLUEOOTH, WI-Fi, and/or other transmitter or receiver suitable for one or two-way wireless communication via the wireless aircraft network 108 and/or the network 110). It is to be appreciated that the mobile device 106 may be equipped with other communication functionality, e.g., a cellular communication device or other wireless connections. These wireless communication units may additionally be used in conjunction with a wireless memory card or be used for other purposes based on design considerations.

The mobile device 106 can include additional components and functionality. Examples include, but are not limited to, a camera, a voice communication system, text or email capabilities, speakers, data connections, and so on. In some other embodiments, a mobile device 106 may also function as a secondary avionics device, a heads-up display (HUD), and/or a cockpit camera. For instance, a mobile device 106 may include position-determining functionality, such as a GPS unit, e.g., a GPS transceiver for providing location information. Other example position determining systems include, but are not limited to, a Global Orbiting Navigation Satellite System (GLONASS), a Galileo navigation system, or other satellite navigation system.

A flight plan application 514 is illustrated separately solely for the purpose of example only. The separate flight plan application 514 is used to highlight that the flight plan application 514, in embodiments, can be a proprietary application. In other embodiments, the flight plan application 514 is non-proprietary. As illustrated, the mobile device 106 can also include an open API 416 that supports the flight plan application 514. The open API 416 refers to an API that is open in that the API supports one or more applications that are not part of secure data/applications suite and may or may not be from a verifiable source (e.g., a non-trusted source).

In additional embodiments, the mobile device 106 can employ other applications that may or may not be avionics related. For example, the memory 308 may store a text or email communication application that permits the sending/receiving of a text or email via a specialized communication system in-flight (e.g., via an Iridium communication network (Iridium Communications Inc., McLean, Va.)). In another embodiment, a weather application 516 is configured to show a weather map for a flight. Other example applications include a position velocity and attitude application, a logbook application 518 and so on. In some embodiments, the applications are proprietary applications (e.g., Garmin Pilot (Garmin International., Olathe Kans.) or WingX (Hilton Software LLC, Parkland, Fla.)), although non-proprietary applications can be used as well. Even though some applications are proprietary, they may still be serviced by the secure API 510 if the application is from a trusted source, complies with a particular data or communication standard, or the like. Although one secure API and one open API are discussed, it will be appreciated that these can be representative of multiple APIs.

In embodiments, the mobile device 106, avionics unit 102, and/or applications are configured to send and/or receive avionics data upon occurrence of an event or at a predefined time. For example, the processor 412 may be configured to synchronize data with the server 120 and/or database 118 so that the avionics data in memory 308 correspond to that in the database 118 and vice versa upon the mobile device 106 connecting to the network 110. This functionality may be set by the application and/or by a profile maintained by the mobile device 106. For example, a pilot may set a profile on the mobile device 106 that causes one or more avionics applications to send/receive avionics data upon occurrence of an event (e.g., logging on to the service provider).

In an implementation, avionics unit 102 is preprogrammed with the avionics application 212 that may employ updating (e.g., may require frequent updates). In this implementation, the mobile device 106 may download a required update for the avionics application 212 from a database 118 via a network 110. When the mobile device 106 is in proximity to and in wireless communication with avionics unit 102 via the wireless device 104, the mobile device 106 uploads the required update to avionics unit 102. The update may include data of any format or file type suitable for use by the avionics application 212 and/or other applications 214, 216, 218 utilized by the avionics unit 102. The update may include application updates and information (e.g., new applications or updates for the applications 212, 214, 216, 218 existing on the avionics unit 102), application data and/or databases (e.g., navigation, obstacle, terrain, and/or other types of data utilized by the avionics unit 102), and/or other software and information utilized by the avionics unit 102 and/or memory card 104. In embodiments, the mobile device 106 may update the avionics unit 102 as a background task or process. In this way, a user such as a pilot is not required to manually update the avionics application 212.

In embodiments, the mobile device 106 may access an account with a subscription service (e.g., a free service, a paid service) to a database 118 and/or server 120 in the network 110. The account can permit the user and/or mobile device 106 to obtain, store, and/or modify data associated with the user, the mobile device 106, and/or avionics unit 102 in a secure manner. In an embodiment, the subscription service can include a website that permits the user or mobile device 106 to access the user's account via the mobile device 106. In the foregoing manner, the subscription service can track avionics data and other data associated with the aircraft and/or flight crew (e.g., pilot) and mirror data on the mobile device 106 and/or data associated with avionics unit 102 onboard an aircraft that is associated with the flight crew (pilot) or mobile device 106. Thus, data from the avionics unit 102 and/or the mobile device 106 can be seamlessly communicated in a convenient manner. Examples of other data include pilot information such as certifications, registrations, health records (e.g., pilot physical records), incident reports, contact information, and so forth. The subscription service, in embodiments, supports an application that is included on the mobile device 106 and/or an avionics unit 102 (e.g., the avionics application 512, flight plan application 514, weather application 516, logbook application 518, etc. of the mobile device 106 and/or the avionics application 212, flight plan application 214, weather application 216, logbook application 218, etc. of the avionics unit 102). In this way, a user (e.g., a pilot) can use the mobile device 106 to interact with data, either locally on the device; on an avionics unit 102 included onboard an aircraft, or remotely on the subscription service/database 118. It is to be appreciated that the mobile device 106 and/or subscription service/database 118 can be configured to differentiate between data associated with different avionics units 102, mobile devices 106, and so forth. In further implementations, other devices can be used to interact with the data on the database 118. For example, a pilot may use a computer in a pilot lounge to enter a flight plan that is uploaded to the database 118 for eventual transfer to the mobile device 106 and the avionics unit 102.

The server 120 and/or database 118 can provide updates periodically and/or upon the occurrence of an event. For example, the server 120 may update the mobile device 106 with data from the database 118 when an airport opens a new runway or closes a runway due to construction, damage, or weather. In another example, the server 120 can send an application update from the database 118 to the mobile device 106 in response to a user entering a flight plan for an aircraft having a particular navigation system. And, as discussed above, the update may include data of any format or file type suitable for use by the avionics application 212 and/or other applications 214, 216, 218 utilized by the avionics unit 102. The update may include application updates and information (e.g., new applications or updates for the applications 212, 214, 216, 218 existing on the avionics unit 102), application data and/or databases (e.g., navigation, obstacle, terrain, and/or other types of data utilized by the avionics unit 102), and/or other software and information utilized by the avionics unit 102 and/or memory card 104.

Example updates may include, but are not limited to, avionics related data, flight plan data, software updates, weather data, and so forth. Updates can be provided and accepted by the relevant device or system (e.g., avionics unit 102, mobile device 106, integrated avionics system 300, etc.) automatically (e.g., without user intervention) or the relevant device or system (e.g., avionics unit 102, mobile device 106, integrated avionics system 300, etc.) can require that that a user manually accept the update. For example, while the mobile device 106 may automatically receive an update from the database, it may not implement the update until a user accepts the update (e.g., clicks an appropriate control to accept the update). In embodiments, the mobile device 106 and/or the server 120 can implement a variety of protocols associated with updates. For example, the mobile device 106 may store a backup version for a period of time should a user wish to revert to the backup.

In embodiments, the server 120 and/or database 118 may act as a conduit for other services or data providers. For example, a user may use a service to access proprietary flight planning data from a third party or different service provider by way of the server 120. A service, in this way, can streamline data communication from the different service providers or a third party to the mobile device 106 and/or to an avionics unit 102 onboard an aircraft associated with the mobile device 106. It is contemplated that the server 120 can add, modify, augment or change data received from a third party service as part of the process.

Thus, the updates and/or other data provided by the server 120 to the mobile device 106 may be acquired from multiple sources. For example, server 120 may access a plurality of servers (third-party and otherwise) to collect and/or aggregate various data. In one configuration, server 120 may access weather data from a first server and flight plan data from a second server. Server 120 may synchronize or otherwise integrate the data collected from various sources for provision to the mobile device 106. Additionally or alternatively, mobile device 106 may be configured to access a plurality of servers to acquire data from various sources. In embodiments, mobile device 106, server 120, avionics unit 102, and/or a third party service are configured so that the mobile device 106 and server 120 automatically recognize or identify one another. For example, the mobile device 106 may include an application that automatically provides account information, keys/certificates, passwords or other authentication data when the mobile device 106 connects to the network 110 (e.g., the Internet, another network (e.g., a cellular communication network) and so on), allowing the mobile device to "log on" to the service. Thus, the mobile device 106 can access the flight planning service when the mobile device 106 is logged onto the server 120.

In some embodiments, a third party service is a service provided by a governmental entity that regulates aircraft travel. For example, for aircraft operating in airspace controlled by the United States of America, the third party service can be a Federal Aviation Administration (FAA) website. This service can permit a user (e.g., the pilot) to file a flight plan via the server 120, which is in communication with the third party service (e.g., the FAA website), and have it approved by the governmental entity (e.g., the FAA).

In further embodiments, data from the mobile device 106 is communicated to the third party service via the server 120. For example, the mobile device 106 upon connecting to the network 110 (e.g., the Internet) can automatically update the database 118 with data that was generated after the mobile device 106 was last in communication with the database 118. Thus, the mobile device 106 can provide avionics data from a recent flight to synchronize the data with that already contained within the database 118 (e.g., data in the user's account). The server 120 may download data to the mobile device 106 responsive to the device 106 connecting to the third party service. It is to be appreciated that the mobile device 106 can communicate/receive data from the server 120 in a variety of ways and account for a variety of situations. For example, the mobile device 106 may limit the data it communicates/receives when a user is actively using the mobile device 106 for another purpose (e.g., only obtain critical updates and/or prioritize data and so forth when the user is accessing other content or applications).

As discussed above, the mobile device 106 communicates with the service via the network 110 and/or the server 120 as illustrated in FIG. 1. Although one network 110 is illustrated, in implementations, multiple networks can be used to communicate data between the mobile device 106 and the server 120. In embodiments, the network 110 is the Internet accessed via a wireless (e.g., Wi-Fi, 3G, 4G, etc.) or a wired connection.

In an embodiment, a user such as a member of the aircraft's flight crew (e.g., a pilot) may bring the mobile device 106 into an aircraft cockpit. The mobile device 106, upon wirelessly contacting an avionics unit 102, communicates avionics data to the avionics unit 102. For example, the mobile device 106 may communicate a flight plan to the onboard avionics unit 102 when the pilot brings the mobile device 106 in the cockpit, where the flight plan has been previously downloaded to the mobile device 106 from the network 110. In this fashion, the mobile device 106 can synchronize its applications, avionics data, and so on with that of the avionics unit 102 using the wireless device 104. As a result, the mobile device 106 can synchronize data it received from the server 120 and/or database 118 with that of the avionics unit 102. For example, the mobile device 106 may download a flight plan a user entered to the database 118 via a home computer. The avionics unit 102 can prompt the user to accept the uploaded avionics data. For example, the avionics unit 102 can prompt a pilot to accept the upload.

It is to be appreciated that the avionics unit 102 can receive and/or transfer data from/to the mobile device 106 in a similar manner and/or at other times, such as in-flight or at the end of a flight. For example, the avionics unit 102 can communicate an updated flight plan to the mobile device 106. In other examples, the avionics unit 102 can output screen shots and other information to the mobile device 106 for use in completing reports, diagnosing potential maintenance issues, or the like. In some embodiments, the mobile device 106 communicates the avionics data as part of a background task. It will be appreciated that communication of data, or portions thereof, can be prioritized or delayed based on a variety of factors.

In additional embodiments, a user can run scenarios, e.g., different flight plans, on the mobile device 106 without them being communicated to the avionics unit 102 until one of the scenarios is accepted. Thus, a pilot encountering a storm front using a weather application 314, 514 can plot different flight plans on the mobile device 106 before selecting one of them and having that flight plan communicated to the avionics unit 102.

As noted, the avionics unit 102 and mobile device 106 can communicate over a wireless aircraft network 108 via a variety of wireless communication protocols and/or devices. Thus, the avionics unit 102 can include a wireless device 104 (e.g., a wireless memory card 112 such as a memory card (e.g., MMC) with a wireless transceiver (Wi-Fi) 114) for communicating with, for example, the mobile device 106. It is to be appreciated that the avionics unit 102 can be equipped with other communication functionality as well (e.g., a satellite communication system, such as an Iridium-type communication device (Iridium Communications Inc., McLean, Va.), or other communication unit, e.g., a BLUETOOTH (Bluetooth SIG, Inc., Bellevue, Wash.) unit). These communication devices may be used in conjunction with the wireless device 104 (e.g., memory card) or be used for other purposes based on design considerations. As will also be appreciated, communication between the mobile device 106 and the avionics unit 102 can occur over a different type of communication link than that used to communicate between the mobile device 106 and the network 110. In embodiments, the avionics unit 102 and mobile device 106 implement a secure, unsecure, or other wireless communication link.

In one implementation, the avionics unit 102 facilitates communication between a mobile device 106 and a remote device (e.g., another mobile device connected to the wireless aircraft network 108 or a network 110). For the purpose of example only, the communication is referred to as a text message. In other embodiments, the communication can be an email or a verbal communication, such as a telephone or other audible communication. In this embodiment, a user of the mobile device 106 has typed a communication. For example, the user may type a message, "This flight is great! I should be home in an hour—miss you." using a touch screen and a virtual keyboard. This communication can be entered using a communication application, e.g., a text message application, included on the processor 502 of the mobile device 106. The communication can be sent from the mobile device 106 to the avionics unit 102 wirelessly using, for example, wireless device 104 (e.g., the SD card with built-in Wi-Fi functionality) and wireless communications module 508. The avionics unit 102 upon receiving the communication can forward it to a network 110 via an included satellite communication unit 304, such as an Iridium communication unit, or another communication unit. The avionics unit 102 may process (handle) the text communication using an application that substantially mirrors the communication application on the mobile device 106. The Iridium wireless communication unit may send the communication, in a format compliant with the Iridium system, to a satellite that communicates over a network 110. As is to be appreciated, communication to the remote device can include different networks 110 (e.g., the Internet, a public telephone network, a cellular network, or the like). Reverse communications, i.e., communications from the remote device to the mobile device 106 can occur as well and are handled generally in a reverse manner.

In a specific implementation, the avionics unit 102 can push aircraft position, velocity, and attitude data to the mobile device 106 through the aircraft wireless network 108 via the wireless device 104. The data can also be pushed to the network 110, the server 120, and/or a database 118. In this implementation, pushing the data to the mobile device 106 can update personal position system data and update a map on mobile device 106. Additionally, data may be pushed in reverse (e.g., from network 110 to mobile device 106 to avionics unit 102). Thus, for example, during flight the mobile device 106 may present various information to the pilot based upon data received from the avionics unit 102, such as attitude, airspeed, altitude, and position information.

In another specific implementation, the avionics unit 102 can push weather data to the mobile device 106 through the wireless aircraft network 108 via the wireless device 104, and the mobile device 106 can push the weather data to the network 110, the server 120, and/or the database 118. The data may also be pushed and/or transmitted in reverse order. In this implementation, the mobile device 106 may also request specific weather information to display, which may save memory and processing bandwidth. In some embodiments, an Sirius XM satellite link may be used to communicate the information (e.g., by using a Garmin GDL-69 satellite link). In another embodiment, mobile device 106 can use a 3G or 4G connection to download weather data while mobile device 106 simultaneously uses a Bluetooth wireless connection to push the weather data to avionics unit 102.

In yet another specific implementation, the avionics unit 102 can push aircraft position, attitude, airspeed, and engine parameters data that are stored in memory 204 to the mobile device 106 through the aircraft network 108 via the wireless device 104. The data can then be used by a logbook application 518 on the mobile device 106 to maintain a pilot logbook to track aircraft maintenance as well as pilot proficiency. In this implementation, the mobile device 106 can then transmit the received data to the network 110, the server 120, and/or a database 118, which may use a service to keep the logbook records available from other network access points.

In some implementations, an avionics unit 102, for instance, may prompt the user to accept the avionics data once it determines that the data is effective and/or suitable. Although this functionality may be implemented in a transparent manner, providing a prompt can alert a user to a change. In some instances, the avionics unit 102 may retain a backup version of the avionics data so that the avionics unit 102 can be returned to a previous state/configuration if selected by a user. For example, the avionics unit 102 may retain a backup version of an application when a change is made to the application to support a particular function (e.g., navigation). Upon receipt of an affirmative user input, the avionics data is implemented (e.g. an update is accepted).

In one embodiment, a pilot may enter a change to a flight plan in-flight. As a result, the avionics unit 102 can wirelessly communicate the data to the mobile device 106 that receives and stores the data in its local memory 504 (e.g., memory included in the mobile device 106). Thus, the avionics data included in memory 504 on the mobile device 106 mirrors that of the avionics unit 102 and vice versa. It is to be appreciated that the mobile device 106 and/or the avionics unit 102 can delay communication of data for a period of time or until an event occurs. For example, the mobile device 106 may not communicate a flight plan change until the user accepts it, if for example the user is scenario planning.

In implementations, the mobile device 106 may notify the server 120 that the avionics data was accepted (now implemented on the avionics unit 102) upon the mobile device 106 coming into communication with the server 120 and/or the database 118. Thus, the database 118 can be updated to reflect that the avionics data is being implemented by the avionics unit 102. In embodiments, avionics data that was generated, modified or updated since the mobile device 106 and server 120 last communicated can be communicated as well.

Generally, any of the functions described herein can be implemented using software, firmware, hardware (e.g., fixed logic circuitry), manual processing, or a combination of these implementations. The terms "module" and "functionality" as used herein generally represent software, firmware, hardware, or a combination thereof. In the case of a software implementation, for instance, the module and/or application represent executable instructions that perform specified tasks when executed on a processor, such as the processor 202, 502. The program code can be stored in one or more computer readable media, an example of which is the memory 204, 504 of the avionics unit and/or the mobile device 106 of FIG. 1. The features and techniques described herein are platform-independent, meaning that the techniques may be implemented on a variety of commercial computing platforms having a variety of processors. In embodiments, the mobile device can implement a variety of operating systems, such as an APPLE operating system (e.g., IOS) manufactured by Apple, Inc., Cupertino, Calif., an ANDROID operating system Google Inc., Mountain View, Calif., a WINDOWS operating system manufactured by Microsoft Corporation, Redmond, Wash., and so forth.

Example Procedures

The following discussion describes avionics data communication techniques that may be implemented utilizing the previously described systems and devices. Aspects of each of the procedures may be implemented in hardware, firmware, software or a combination thereof. The procedures are shown as a set of blocks that specify operations performed by one or more devices and are not necessarily limited to the orders shown for performing the operations by the respective blocks. In portions of the following discussion, reference will be made to the environments, devices and/or the systems illustrated in FIGS. 1 through 5.

Figure 6:
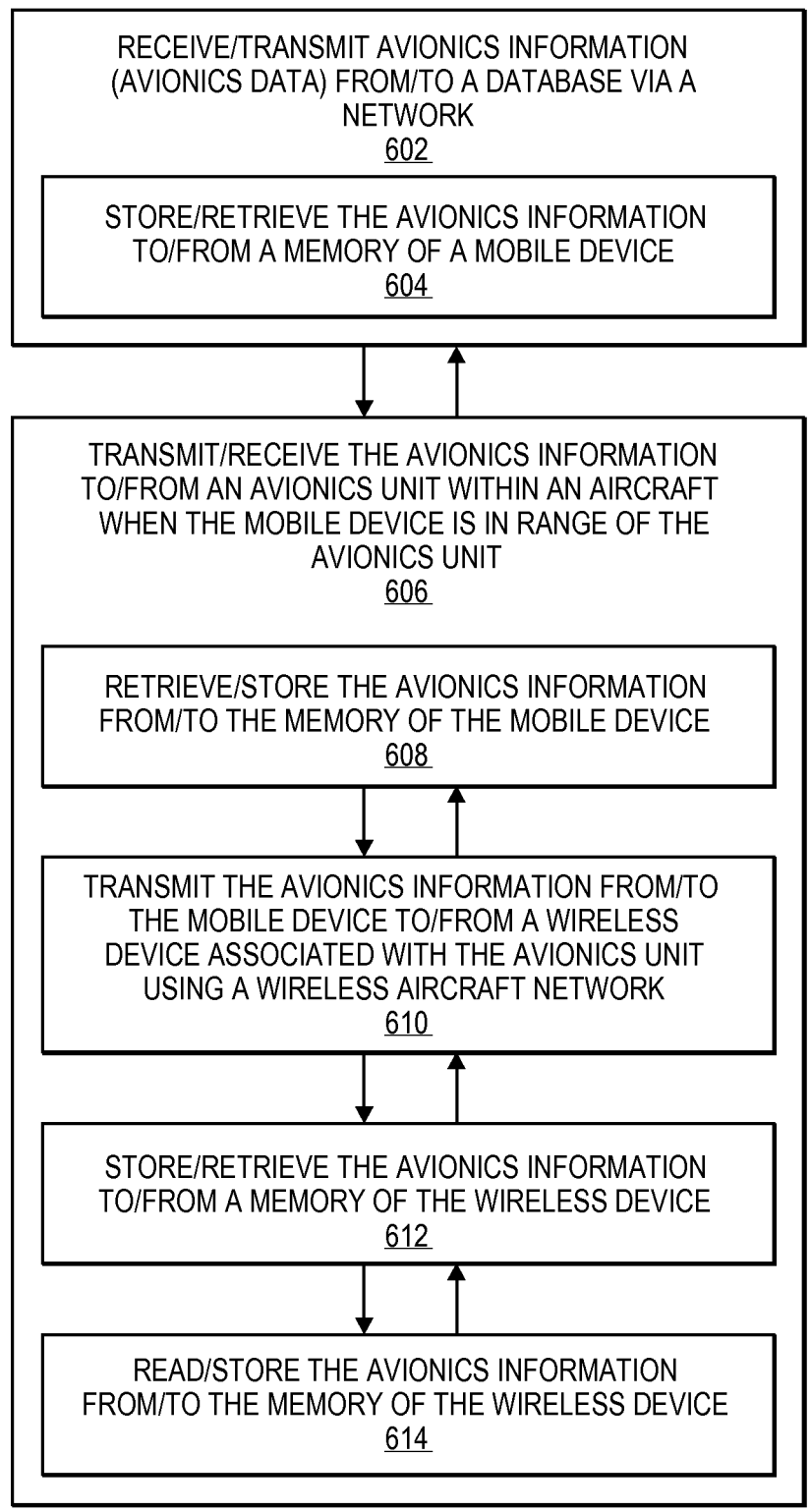
FIG. 6 is a flow diagram depicting a method in an example implementation in which information such as avionics data is exchanged between a mobile device and an avionics unit via a wireless aircraft network to simplify aircraft operation and maintenance.

FIG. 6 depicts a procedure 600 in an example implementation in which avionics information (avionics data), which may be configured to facilitate the operation of an aircraft, is exchanged between a database 118, a mobile device 106, and an avionics unit 102, which may comprise a component within an integrated avionics system 300 of an aircraft. The avionics data is transferred between the mobile device 106 and the avionics unit 102 via a wireless aircraft network 108 using a wireless device 104 such as a memory card 112 having a wireless transceiver 114 that is received in a memory card reader 116 of the avionics unit 102. In embodiments, the avionics information (avionics data) may be communicated bi-directionally between the database 118 and the mobile device 106 via a network 110, and/or between the mobile device 106 and the avionics unit 102 via the wireless aircraft network 108 and the wireless device 104.

As shown in FIG. 6, the mobile device may receive avionics information (avionics data) from a database via a network (Block 602). For example, in the embodiment shown in FIG. 1, the mobile device 106 shown receives (acquires) the avionics information from the database 118 via the network 110. Example avionics data may include, but is not necessarily limited to: flight planning data, weather data, logbook data, maintenance data, and data associated with an avionics unit (e.g., onboard avionics). Other avionics data includes terrain data, obstacle data, airfield data, airport data, an avionics software update, or the like.

The avionics information is stored to memory of the mobile device (Block 604). For example, as shown in FIGS. 1 and 5, the avionics information may be stored in memory 504 of the mobile device 106 to be transferred to the avionics unit 102 when the mobile device is carried into the aircraft cockpit by a user such as a member of the aircraft flight crew (e.g., the pilot).

The mobile device 106 may be configured for communication with the database 118 via one or more networks 110 for communication of the avionics information. For example, the mobile device 106 may receive updates to avionics data responsive to the mobile device 106 connecting to the network 110 (e.g., the Internet, a satellite network, etc.). In this example, an application stored in memory 504 and executed by the processor 502 of the mobile device 106 may routinely check to determine whether an update is available from the database 118 on the network 110. The avionics information, comprising the update, can be communicated to the mobile device 106 so that the avionics data stored in the memory 504 of the mobile device 106 mirrors that included on the database 118. For instance, if an update is available for a navigation application, the update is automatically transferred to the mobile device 106 so that the update substantially matches that included on the database 118. Communication of the update and implementation of the update can be automatic (no user intervention is involved). However, in some instances, the application may prompt the user to accept the update. As discussed below, this prompt can mirror a prompt that can occur on an onboard avionics unit 102 to which the mobile device 106 can synchronize data. In embodiments, manual input of avionics data may be accepted. Manual avionics data input can comprise acceptance of flight plan data, a logbook entry and so forth. A user, for example, may use the mobile device 106 to update a flight plan he/she previously stored in the database 118 on the network 108. In this instance, the mobile device 106 may communicate the updated flight plan data back to the database 118 when the mobile device 106 is in communication with the database 118 via the network 110 as discussed below.

The avionics information may be transmitted to an avionics unit within the aircraft when the mobile device is within range of the avionics unit (Block 606). For example, as shown in FIG. 1, the mobile device 106 may transmit the avionics information to the avionics unit 102 via the wireless aircraft network 108 when the mobile device 106 is carried into the aircraft cockpit by a user such as a member of the aircraft flight crew (e.g., the pilot).

In embodiments, the avionics information is retrieved from the memory of the mobile device (Block 608) and transmitted from the mobile device to a wireless device associated with the avionics unit (Block 610). For example, as shown in FIGS. 1 and 5, the processor 502 of the mobile device 106 may cause the avionics information to be retrieved from the memory 504 of the mobile device 106. The processor 502 may further cause the communications module 508 of the mobile device 106 to transmit the avionics information to the wireless device 104 via the wireless aircraft network 108. As noted, in embodiments, the wireless aircraft network 108 may comprise the personal area network described above (e.g., Wi-FI, BLUETOOTH, etc.). The wireless communication module 508 of the mobile device 106 includes a transceiver (e.g., a Wi-Fi (IEEE 802.11) transceiver, a personal area network (e.g., BLUETOOTH network) transceiver, combinations thereof, and so forth), for communicating via the wireless aircraft network 108 (and/or the network 110). The wireless device 104 may comprise a memory card 112 as described above that is configured to communicate with the mobile device 106 via the wireless aircraft network 108.

The avionics information is then stored to a memory of the wireless device (Block 612). For example, as shown in FIG. 4, where the wireless device comprises a memory card 112, the avionics data may be stored to the memory 402 of the memory card 112. In embodiments, the memory 204 comprises flash memory. However, other types of memory are contemplated.

The avionics unit may then read the avionics information from the memory of the wireless device (Block 614). For example, as shown in FIG. 2, the memory read application 220 stored in the memory 204 and executed by the processor 202 of the avionic unit 102 may read avionic information from the memory 402 of wireless device 104. In this manner, the memory read application 220 allows the avionics unit 102 to access wirelessly-acquired data without requiring that the avionics unit 102 be equipped with additional hardware and/or software for wireless communication capability.

Avionics information may also be received from the avionics unit (e.g., transmitted by the avionics unit) when the mobile device is within range of the avionics unit (Block 606). For example, as shown in FIG. 1, the avionics unit 102 may also transmit avionics information to the mobile device 106 via the wireless aircraft network 108 when the mobile device 106 is carried into the aircraft cockpit. In embodiments, the transmission of avionic information from the avionic unit 102 to the mobile device 106 may occur in conjunction with the receipt of avionic information by the avionic unit 102 from the mobile device 106. The transmission of avionic information may also occur independently of the receipt of avionic information from the mobile device 106.

In embodiments, the avionics unit may store (write) avionics information to the memory of the wireless device (Block 614). For example, the memory read application 220 may further include functionality to write avionic information to the memory 402 of the wireless device 104 for transmission to the mobile device 106 via the wireless aircraft network 108 using the transceiver 114 of the wireless device 104.

The avionics information may then be retrieved from the memory of the wireless device (Block 612) and transmitted by the wireless device to the mobile device using the wireless aircraft network (Block 610). For example, where the wireless device comprises a memory card 112, as shown in FIG. 4, the avionics data may be read from the memory 402 of the memory card 112 and transmitted by the transceiver 114 to the mobile device 106 via the wireless aircraft network 108 where the information is received by the communications module 508 of the mobile device 106.

The avionics information may be stored to the memory of the mobile device (Block 608). For example, as shown in FIG. 5, the processor 502 of the mobile device 106 may cause the avionics information to be stored to the memory 504 of the mobile device 106 when the information is received by the communications module 508.

In some embodiments, the mobile device may further transmit avionics information to the database 118 via a network (Block 602). The avionics information may be retrieved from memory of the mobile device (Block 604) and thereafter transmitted to the database for storage and/or processing. For example, as shown in FIGS. 1 and 5, the avionics information may be retrieved from memory 504 of the mobile device 106 to be transferred to the database 118 via the network 110 when the mobile device 106 is coupled to the network 110.

In embodiments, the avionics unit 102, wireless device 104 and/or the mobile device 106 may institute a handshake or other identification protocol to identify one device to another. For example, the avionics unit 102 and/or the wireless device 104 may recognize the mobile device 106 based on identification information included on a wireless memory card received by the mobile device 106 as part of the wireless communication module 508.

The avionics data may be communicated as a background task. Communication of the data can be prioritized or demoted accordingly based on a variety of factors. In some implementations, an onboard avionics unit 102, upon receiving the data, can check to determine that the data conforms to a predetermined requirement. For example, the avionics unit 102 can test whether an update to an avionics application will operate properly.

In use, a pilot may access database 118 using the mobile device 106 while at home, at the airport, or even while in the cockpit of the aircraft. Avionics data from the database 118 is stored in the memory 504 of the mobile device 106. The pilot may insert the memory card 112 into the memory card slot of the avionics unit 102. The memory card 112 may be permanently stored within the memory card slot or removed by the pilot in the event the aircraft is shared with other pilots. The pilot may establish wireless communication between the mobile device 106 and the memory card 112, such as by pairing the two devices or otherwise connecting the two devices. Avionics data from the memory 504 of the mobile device 106 may be transmitted from the mobile device 106 to the memory card 112. Similarly, avionics data from the memory card 112, and/or the memory of the avionics unit 102, may be transmitted to the mobile device 106. The avionics unit 102 may access data received by the memory card 112 to perform various functions.

Conclusion

Although an environment 100 including components such as the avionics unit 102, wireless device, and mobile device 106, that implement the techniques of the present disclosure has been described with reference to example implementations illustrated in the attached drawing figures, it is noted that equivalents may be employed and substitutions made herein without departing from the scope of the disclosure as recited in the claims. Further, the environment 100 and its components as illustrated and described herein are merely examples of a system and components that may be used to implement the present disclosure and may be replaced with other devices and components without departing from the scope of the present disclosure.

What is claimed is:

1. An avionics system, comprising:
a regulatory-certified avionics display unit configured to be installed in an aircraft instrument panel, the avionics display unit including a memory storing an application module operable to perform avionic functions and a memory card reader including a memory card slot; and
a removable memory card configured to be received in the memory card slot of the of the avionics display unit, the removable memory card having a wireless transceiver operable to communicate with a mobile device via a wireless network to receive avionics information,
wherein the avionics display unit is configured to access the avionics information received by the removable memory card through the wireless network and use the received avionics information with the stored application module to perform the avionic functions.

2. The avionics system of claim 1, wherein the wireless network comprises a personal area network (PAN).

3. The avionics system of claim 2, wherein the memory card transceiver includes a Wi-Fi transceiver and the personal area network (PAN) comprises a Wi-Fi network.

4. The avionics system of claim 2, wherein the personal area network (PAN) comprises a Bluetooth network and the wireless transceiver includes a Bluetooth transceiver.

5. The avionics system of claim 1, wherein the avionics display unit is configured to write data to the memory card for transmission to the mobile device through the wireless network.

6. The avionics system of claim 5, wherein the data written to the memory card by the avionics display unit includes at least one of aircraft position, aircraft velocity, attitude data or an aircraft engine parameter.

7. The avionics system of claim 6, wherein the mobile device further includes a display and is configured to present aircraft position on the display.

8. The avionics system of claim 6, wherein the mobile device further includes a memory to store the data received by the mobile device and is configured to communicate the stored data to an internet-accessible database.

9. The avionics system of claim 1, wherein the application module is a flight plan application and the received avionics information includes flight plan data.

10. The avionics system of claim 1, wherein the received avionics information includes application data.

11. The avionics system of claim 10, wherein the application data includes navigation data.

12. The avionics system of claim 1, wherein the received avionics information includes an application update.

13. The avionics system of claim 12, wherein the application update includes at least one of avionics data, flight plan data, software update or weather data.

14. The avionics system of claim 1, wherein the mobile device receives the avionic information from an internet-accessible database.

15. An avionics system, comprising:
a regulatory-certified avionics display unit configured to be installed in an aircraft instrument panel, the avionics display unit including a memory storing an application module operable to perform avionic functions and a memory card reader including a memory card slot;
a mobile device having a memory and operable to communicate avionics information via a wireless network; and
a removable memory card configured to be received in the memory card slot of the avionics display unit, the removable memory card having a transceiver operable to communicate with the mobile device via the wireless network to receive the avionics information,
wherein the avionics display unit is configured to access the avionics information received by the removable memory card through the wireless network and use the received avionics information with the stored application module to perform the avionic functions, and
wherein the avionics display unit is configured to write data to the memory card for transmission to the mobile device through the wireless network.

16. The avionics system of claim 15, wherein the wireless network comprises a personal area network (PAN).

17. The avionics system of claim 16, wherein the memory card transceiver includes a Wi-Fi transceiver and the wireless network comprises a Wi-Fi network.

18. The avionics system of claim 16, wherein the personal area network comprises a Bluetooth network and the wireless transceiver includes a Bluetooth transceiver.

19. The avionics system of claim 15, wherein the received avionics information includes flight plan data.

20. The avionics system of claim 15, wherein the application module is a flight plan application and the mobile device is configured to acquire the avionics information from an internet-accessible database.

21. The avionics system of claim 20, wherein the mobile device includes a cellular communications device configured to access the internet-accessible database.

22. The avionics system of claim 15, wherein the mobile device is selected from the group consisting of a smart phone, a tablet device, a watch, and a laptop computer.

23. A method of transferring data from a mobile device to a regulatory-certified avionics display system, the method comprising:
storing, using a processor of the mobile device, avionics data in a memory of a mobile device;
receiving, using a memory card slot of the regulatory-certified avionics display system, a removable memory card inserted into the memory card slot, the removable memory card including a wireless transceiver;
establishing, using the processor of the mobile device and a processor of the regulatory-certified avionics display system, wireless communication between the mobile device and the removable memory card;
transmitting, using a transceiver in the mobile device, the avionics data stored in the memory of the mobile device to a memory of the removable memory card; and
accessing, using the processor and a memory of the regulatory-certified avionics display system, the transmitted avionics data stored in the removable memory card for use with an application module operable to perform the avionic functions stored in the memory of the regulatory-certified avionics display system.

24. The method as recited in claim 23, further comprising using the mobile device to acquire the avionics data through the internet.

25. The method as recited in claim 24, wherein the avionics data is acquired from an internet-accessible database.

26. The method as recited in claim 23, further including writing data from the avionics display system to the removable memory card for wireless transmission to the mobile device.

27. The method as recited in claim 23, wherein the mobile device is a tablet device.

28. The method as recited in claim 23, wherein the avionics data comprises flight plan data.

* * * * *